(12) United States Patent
Mange et al.

(10) Patent No.: US 7,730,831 B2
(45) Date of Patent: Jun. 8, 2010

(54) PIN-LESS SOCKET FOR FROZEN CONFECTIONS

(75) Inventors: Christian Mange, Dublin, OH (US); Matthias Ruppert, Edertal-Giflitz (DE)

(73) Assignee: Nestec S.A., Vevey (CH)

( * ) Notice: Subject to any disclaimer, the term of this patent is extended or adjusted under 35 U.S.C. 154(b) by 1324 days.

(21) Appl. No.: 11/136,358

(22) Filed: May 25, 2005

(65) Prior Publication Data
US 2006/0280826 A1    Dec. 14, 2006

(51) Int. Cl.
*A23G 9/24* (2006.01)
(52) U.S. Cl. .............. 99/427; 99/426; 99/431; 99/494; 118/30; 118/31; 118/503; 24/537; 24/568
(58) Field of Classification Search ........... 99/427, 99/426, 431, 494; 118/26, 30, 306, 317, 118/324, 503, 31; 24/537, 527, 568; 279/32; 294/95, 97, 99.1, 103.1, 113
See application file for complete search history.

(56) References Cited

U.S. PATENT DOCUMENTS

| | | | |
|---|---|---|---|
| 280,464 A * | 7/1883 | Gifford | 248/317 |
| 1,094,113 A * | 4/1914 | Bissen | 254/29 R |
| 2,719,508 A * | 10/1955 | Lilja | 118/31 |
| 3,985,223 A | 10/1976 | Forcella et al. | |
| 4,646,398 A * | 3/1987 | Myhrman | 482/107 |
| 6,698,071 B1 * | 3/2004 | Greer et al. | 24/537 |
| 7,267,075 B2 * | 9/2007 | McKay | 118/13 |

FOREIGN PATENT DOCUMENTS

| | | |
|---|---|---|
| DE | 20209984 | 10/2002 |
| EP | 0 925 721 | 6/1999 |
| WO | WO 99/56560 | 11/1999 |

\* cited by examiner

*Primary Examiner*—Reginald L Alexander
(74) *Attorney, Agent, or Firm*—Gail C. Silver; Borden Ladner Gervais LLP

(57) ABSTRACT

A pin-less socket apparatus and manufacturing system for assembling a frozen confection using such socket apparatus including a socket for accepting a conical food product therein, the socket having a hook with one or more teeth located at an outer periphery of the socket, a hinge located on an outside of the socket, the hook movably attached to the socket via the hinge, a force mechanism for holding the hook in place against the socket. The force mechanism takes the form of either an annular spring or O-ring located around the socket and hook or a linear spring attached to the hook in a lever-type manner. The manufacturing system includes a coating area for coating a wafer cone with a moisture-resistant layer, a filling area having a filler for inserting a semi-frozen confection into the wafer cone, a cooling area for accepting the wafer cone with the semi-frozen confection and including a hardening tunnel for freezing the wafer cone and the semi-frozen confection, and a dipping area including more than one pin-less socket apparatus for accepting the wafer cone and moving the wafer cone through a dipping bin. Within the system, the coating, filling, cooling, and dipping areas may be on the same or separate assembly loops including the socket apparatus within one or more of such assembly loops.

8 Claims, 8 Drawing Sheets

PIN-LESS SOCKET FOR FROZEN CONFECTIONS

FIELD OF THE INVENTION

The invention relates to manipulation of frozen confections along a continuously moving manufacturing line. More specifically, the present invention involves a pin-less socket that grips such frozen confections, a method of gripping with such sockets, and a manufacturing system that utilizes such sockets.

BACKGROUND OF THE INVENTION

In the art of manufacturing frozen confections such as ice cream cones, a moving assembly line is used to continuously process the confections. In the instance of ball-top ice cream cones, a wafer cone is provided by some means and manner into a fixed position on the assembly line. Often, hand placement of the wafer cones occurs by a human operator. Alternatively, the human operator may place stacked wafer cones within a de-stacking mechanism that assists in automating the initial phase of frozen confection manufacture. The wafer cones are commonly held within an upright position via some tray mechanism or truncated cone holder. The wafer cones are normally-coated on their interiors with a liquid chocolate in order to provide a moisture barrier from subsequent filling with a semi-frozen product—e.g., ice cream. The chocolate coating is typically sprayed from above into the upright wafer cones. Extrusion nozzles are used to fill each wafer cone with the semi-frozen product as the wafer cones move into selected placement along the assembly line. The wafer cone filled with dry-coated, semi-frozen product is then moved along the assembly line into a hardening chamber. Further downstream, a dry coating apparatus is placed above the assembly line for covering the semi-frozen product with ground nuts or similar edible material. Subsequently, the frozen confections are packaged into wrappers and boxed for shipment and sale to the ultimate end-user in a manner well known in the art.

While such manufacturing of frozen confections has existed for a long time in the art, there has been room for improvement. Such needs are clear when wastage is considered. Specifically, spraying of a vertically oriented wafer cone from above often leads to overspray and wastage of the chocolate liquid. Moreover, the chocolate liquid tends to pool at the bottom of the wafer cone, thus often requiring an excessive amount of spray to evenly coat the wafer cone's interior. As well, dry coating from above via sprinkling of nuts or other edible material often results in uneven coating and related wastage of such dry coating that does not readily stick to the semi-solid product. Due to food safety concerns, it is often not possible to reuse the chocolate liquid overspray or unapplied dry coating materials. Some efforts in the art have been made to alleviate the need to maintain the wafer cone within an upright position to thereby reduce such wastage. U.S. Pat. No. 3,985,223 shows one such example of an upright gripper.

There exist known efforts in the manufacture of ball-top cones to provide an assembly line with mechanisms that pivotably present the wafer cone in a movable position. Such mechanisms that hold the wafer cone in a moveable position are commonly referred to as grippers. In such movable position, the wafer cone may be presented along the assembly line in an inverted position and coated with a liquid chocolate spray from below. In order to overcome the undesirable effects of moisture migrating from a relatively moist ice cream material into a relatively dry cone, the frozen confection industry has provided a coating layer between the cone and ice cream to prevent migration of such moisture. The standard coating layer that has been used by the industry is a chocolate product that is vegetable oil based and thus provides a relatively water-impermeable moisture barrier. In manufacture of the ice cream product, the cone is coated by some form of spray applied to the interior of the cone prior to introduction of the ice cream in order to maintain the crispiness of the cone.

Spraying the liquid chocolate from below allows the spray to be forced well into the cone whereby gravity provides for a secondary movement of the spray down the interior of the cone towards the rim. The movable cone may then swivel into an upright position to be filled from above with the semi-frozen product. Thereafter, the movable cone may then again swivel to place the ball-top in a downward position such that the movable cone may be dipped into a bin or tray holding the dry coating of choice. The moveable cone would then continue along the assembly line to the hardening chamber and be packaged in a known manner as discussed above. There are commonly three different types of gripper mechanisms for pivotably presenting a wafer cone.

One such known example is a pin gripper that utilizes a skewer-type of arrangement including a pin used to puncture and hold the movable cone rotatably about the pin. While pin grippers positively hold the wafer cone, they suffer from drawbacks that include both increased cone breakage and creating two holes through the wafer. The holes in the wafer are also through the chocolate layer and underlying ice cream product. This often reduces product shelf life as the holes provide a path for moisture to migrate from the ice cream to the wafer and thereby soften or otherwise reduce the wafer crispness.

Another such example is a pin-less gripper with a positive opening that utilizes a relatively complex clamp and spring arrangement to hold the movable cone. The mechanical complexity involved in such an arrangement reduces access for cleaning surfaces and as such represents a food safety concern.

Another such example is a pin-less gripper with a passive opening shown by EP 0925721 which utilizes a pressure-fit arrangement to hold the movable cone. Such a passive manner of gripping does not provide a secure holding of the wafer or needs a strong pressure on the wafer that increases the level of breakage. This leads to premature release of the wafer cone and significant wastage problems.

None of such gripping arrangements provides the necessary holding power in contemporary high-speed assembly lines. Further, many such holding arrangements often lead to damaging effects on the cones and can lead to total wastage of a broken or otherwise unusable product. Still further, the known mechanisms are relatively complex and therefore tend to be mechanically unreliable and require much maintenance.

SUMMARY OF THE INVENTION

The object of the invention is to remedy the drawbacks set out above by proposing a pin-less socket apparatus in which a wafer cone is securely held so as to improve a frozen confection method of assembly and system incorporating such apparatus and method.

One embodiment of the invention involves a pin-less socket apparatus including a socket for accepting a conical food product therein, the socket having a groove located at an outer periphery of the socket, a hinge located on an outside of the socket, a hook having one or more teeth, the hook movably attached to the socket via the hinge, a compression means for holding the hook in place against the socket, the compression means located within the groove.

Another embodiment of the invention involves a manufacturing system for assembling a frozen confection including a coating means for coating a wafer cone with a moisture-resistant layer, a filling station having a filler for inserting a semi-frozen confection into the wafer cone, a cooling station for accepting the wafer cone with the semi-frozen confection and including a hardening tunnel for freezing the wafer cone and the semi-frozen confection, a dipping station including more than one pin-less socket apparatus for accepting the wafer cone and moving the wafer cone through a dipping bin, the socket apparatus including a socket for accepting a conical food product therein, the socket having a groove located at an outer periphery of the socket, a hinge located on an outside of the socket, a hook having one or more teeth, the hook movably attached to the socket via the hinge, and a compression means for holding the hook in place against the socket, the compression means located within the groove.

DETAILED DESCRIPTION

Figure 1A:
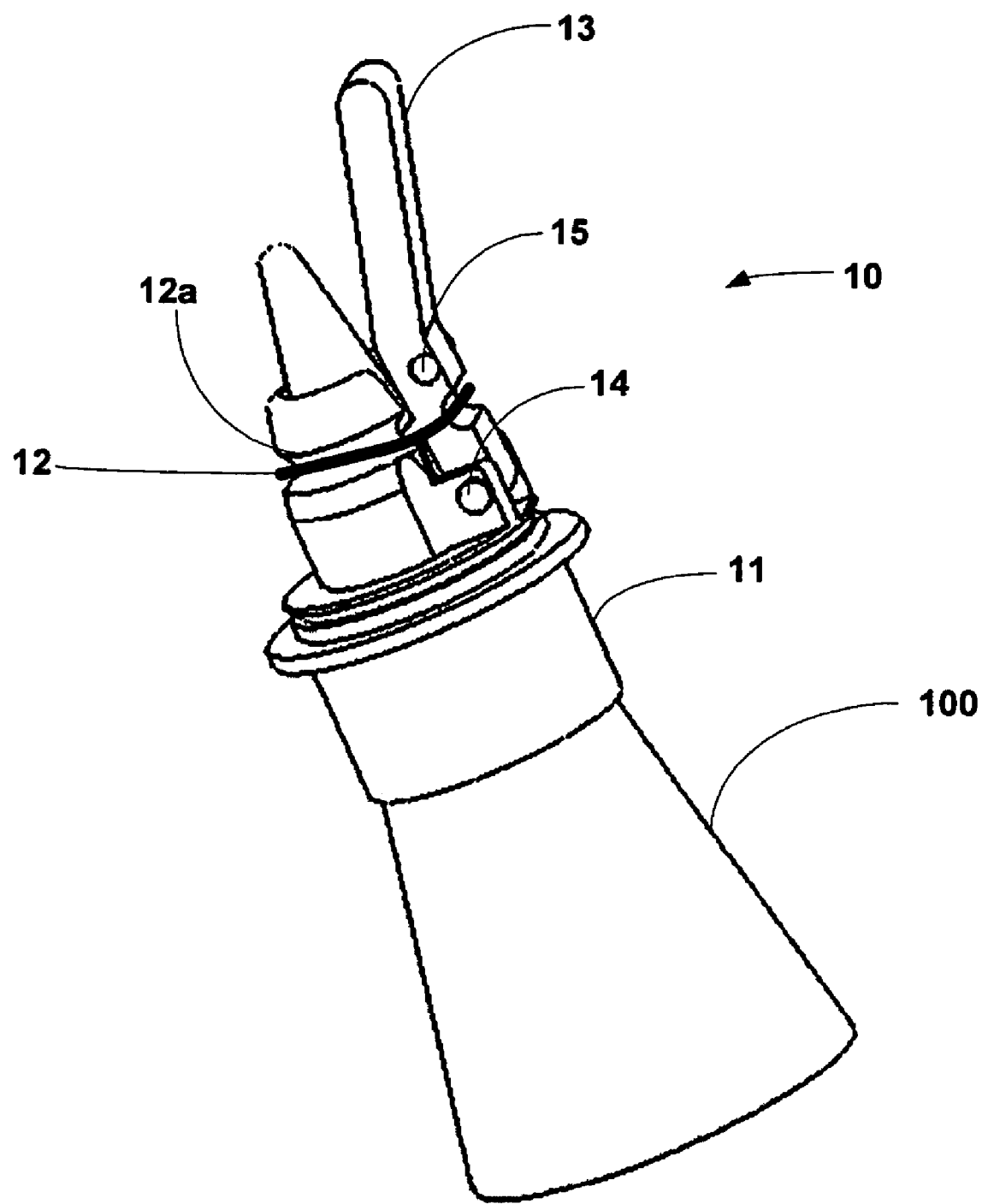
FIG. 1A is a perspective view of a pin-less socket in accordance with a first embodiment of the present invention with a wafer cone inserted therein.
Figure 1B:
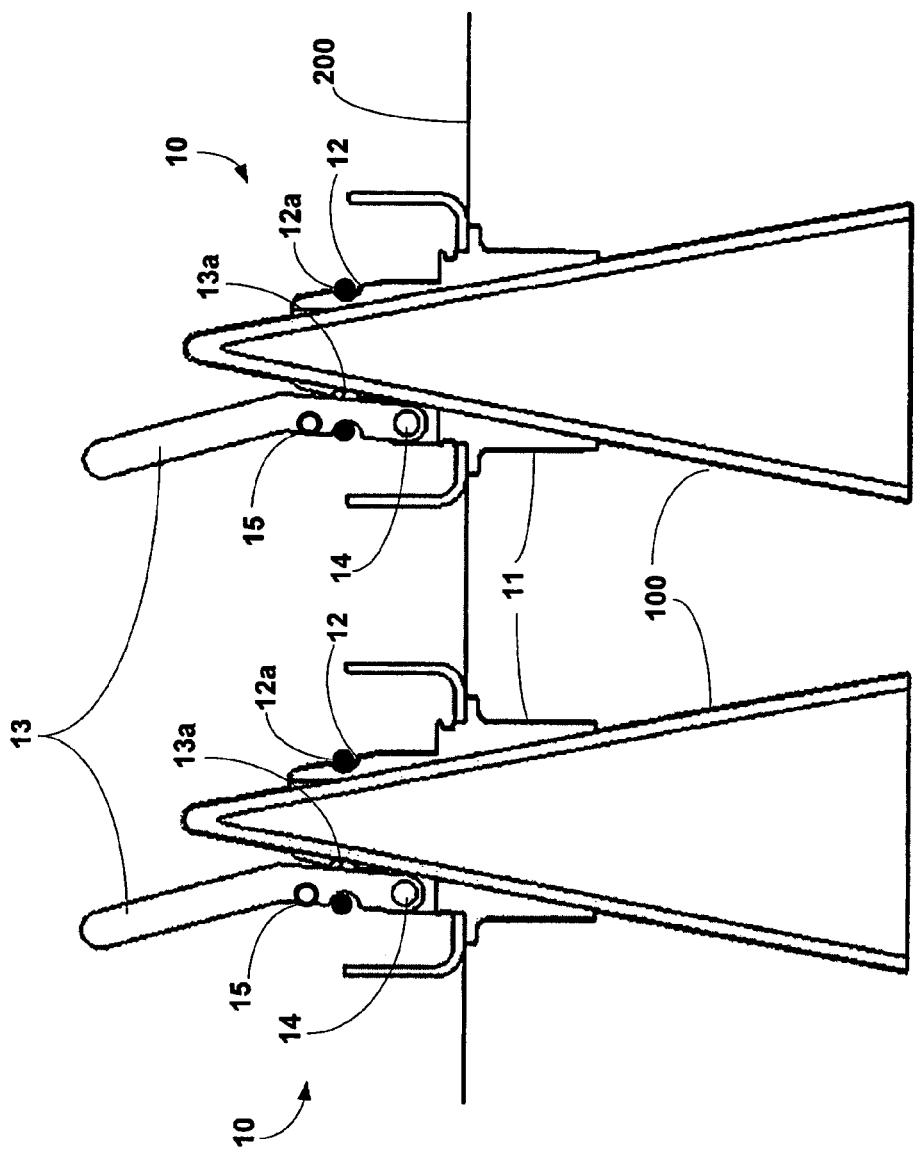
FIG. 1B is a cross sectional view of two pin-less sockets as shown in FIG. 1A with two wafer cones inserted therein.

FIG. 1A is a perspective view of a pin-less socket 10 in accordance with a first embodiment of the present invention. The pin-less socket 10 is shown with a wafer cone 100 inserted therein. The pin-less socket 10 includes a socket 11 in the form of a truncated section that is conical and hollow. The socket is smooth and shaped to accept the bottom half of the wafer cone 100. It should be understood that wafer cones are fabricated in standard sizes that deviate very little cone to cone. Accordingly, the bottom half of wafer cone 100 may snugly fit into the socket 11 even with minor cone variations. The wafer cone 100 is held in place via a hook 13 that includes a hinge 14. An O-ring 12 located within a groove 12a surrounds the outside of the socket 11 to cause compression of the hook 13. Compression of the hook 13 causes one or more teeth (shown as 13a in FIG. 1B) to grip the tapered end of the wafer cone 100. A stop pin 15 limits the compression of the teeth that gives an end position of the hook. It should be noted that the tapered end of the cone is typically thicker than the rest of the cone. Due to this relative increased thickness, any damage to the cone is minimized.

FIG. 18 shows a cross sectional view of two pin-less sockets 10 as shown in FIG. 1A with two wafer cones 100. From the FIG. 1B cross-section, teeth 13a can be seen. It should be understood that this inverted position of the wafer cone 100 is considered to be a preferred manner of presenting the wafer cone 100 for spray coating from below. In such manner of coating, a more even distribution of spray coating (e.g., liquid chocolate) is possible with minimal over spray concerns. The hook 13 is normally in a compressed position by O-ring 12 or some similar circumferentially placed spring. Release of the wafer cone 100 is accomplished via movement of the hook 13 such that teeth 13a disengage from the wafer cone 100. Movement of the hook 13 may be facilitated in any known manner without straying from the intended scope of the present invention including the use of pistons, cams, or similar electromechanical mechanisms (not shown). A series of pin-less sockets 10 and associated wafer cones 100 can be held as shown within a flexible conveyor belt 200 to form part of an assembly line system. The present invention is advantageous in that the same pin-less socket 10 may form an integral part of many different such assembly line systems.

Figure 2A:
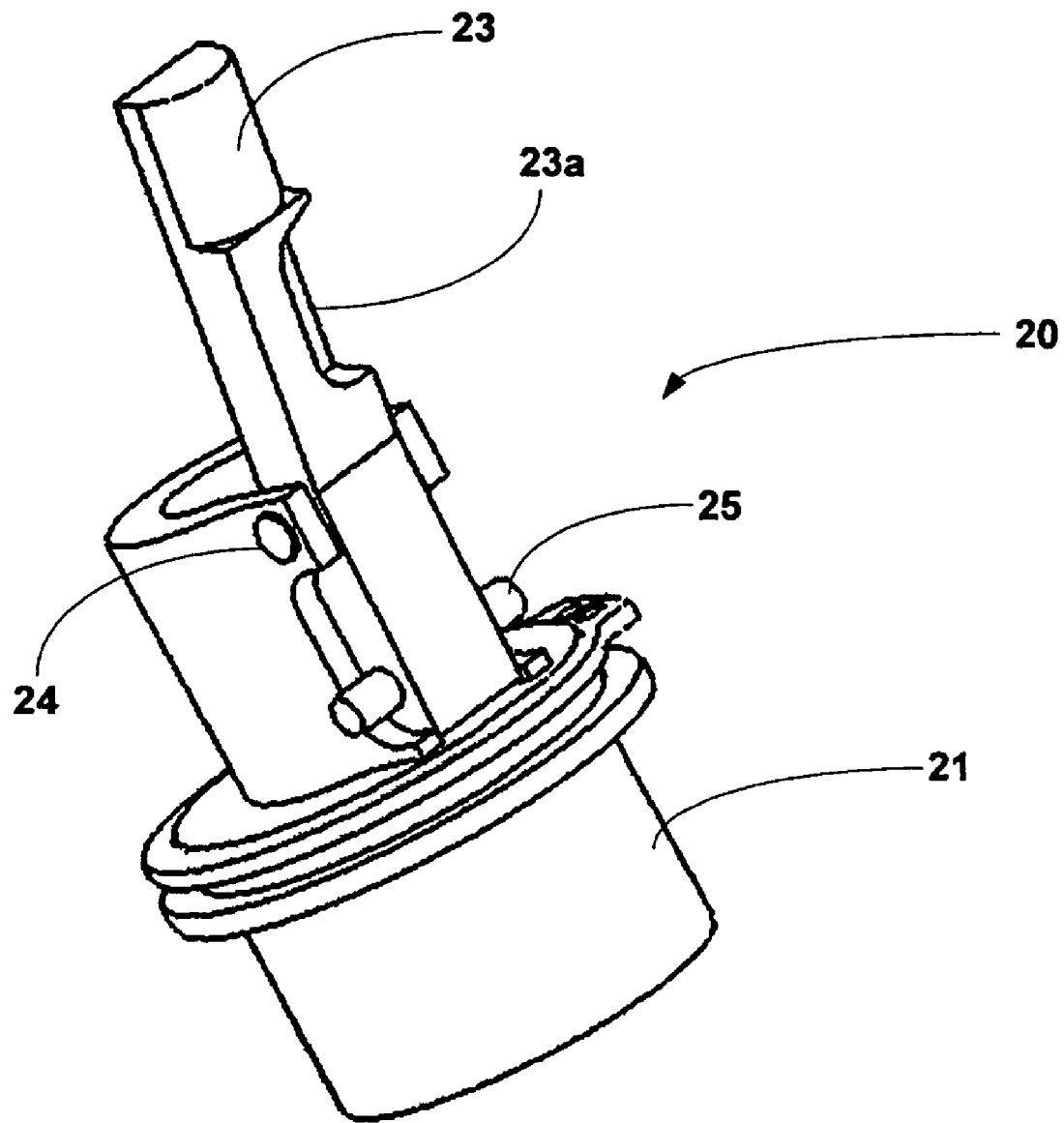
FIG. 2A is a perspective view of another pin-less socket in accordance with a second embodiment of the present invention.

FIG. 2A is a perspective view of a pin-less socket 20 in accordance with a second embodiment of the present invention. For clarity, the pin-less socket 20 is shown without any wafer cone inserted therein, though such wafer cone insertion is identical to that shown in regard to FIGS. 1A and 1B. Similar to the first embodiment, the pin-less socket 20 includes a socket 21 in the form of a truncated section that is conical, hollow, and smoothly shaped to accept the bottom half of a wafer cone that is held in place via a hook 23 that includes a hinge 24. In this second embodiment, no circumferential compression mechanism is used. Rather, the hook 23 includes a section 23a modified to accept a spring (shown as 23b in FIG. 2B) to provide a lever-type action in order to cause compression of the hook 23. Lever-type action of the hook 23 causes one or more teeth (shown as 23c in FIG. 2B) to grip the tapered end of a wafer cone. A stop pin 25 limits the compression of the teeth that gives an end position of the hook.

Figure 2B:
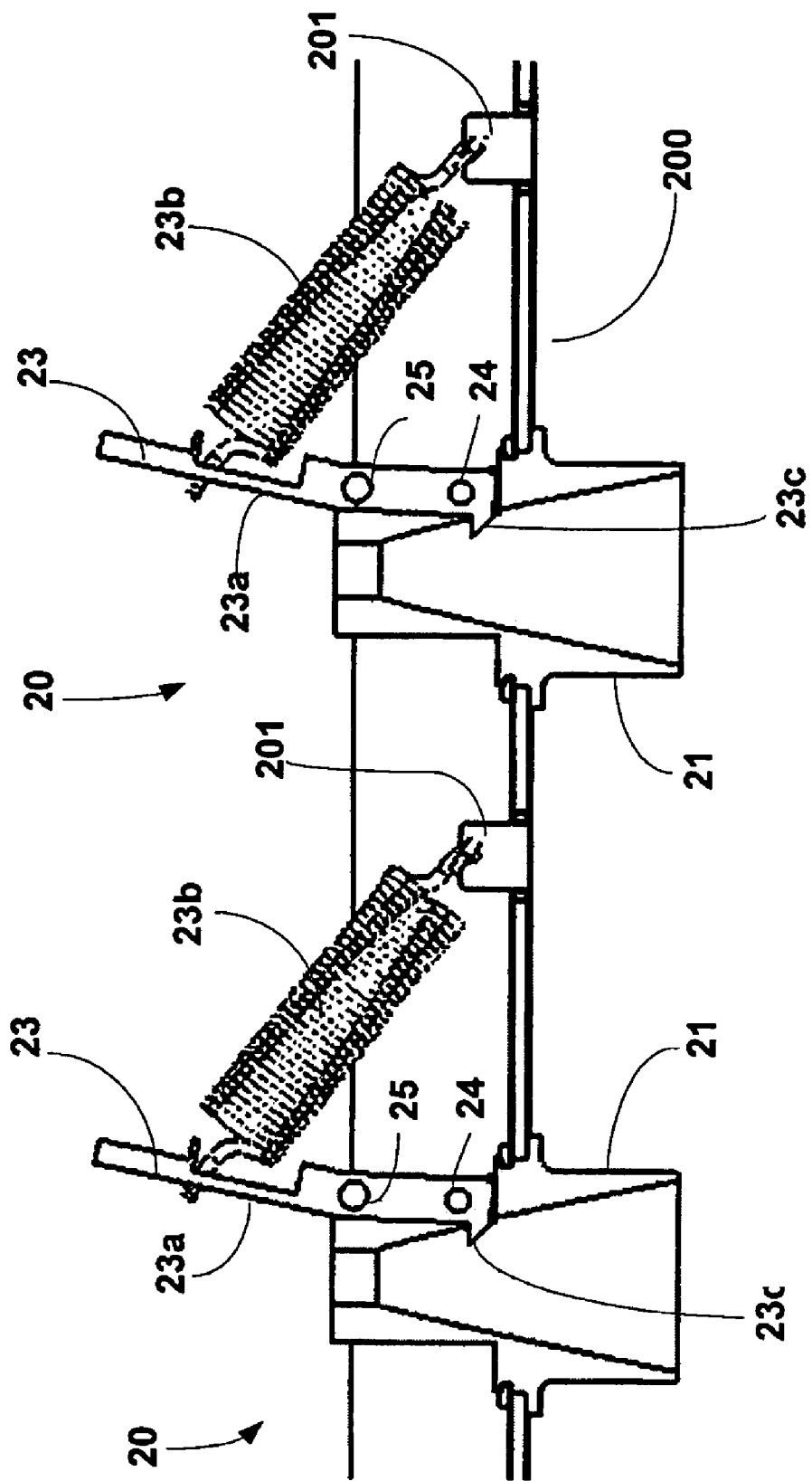
FIG. 2B is a cross sectional view of two pin-less sockets as shown in FIG. 2A and showing an accompanying spring mechanism.

FIG. 2B shows a cross sectional view of two pin-less sockets 20 as shown in FIG. 2A. From the FIG. 2B cross-section, teeth 23c can be clearly seen as the wafer cones have been omitted for clarity. As before, it should be understood that this inverted position of a wafer cone is considered to be a preferred orientation to enable spray coating from below because a more even distribution of spray coating (e.g., liquid chocolate) is possible with minimal over spray concerns. The hook 23 is normally in an engaged position by action of the spring 23b. Disengagement of the hook 23 is accomplished via lever-type movement of the hook 23 to counter the force of the spring 23b such that teeth 23c disengage from a wafer cone inserted therein (not shown for purposes of clarity). In contrast to the first embodiment, the use of the spring 23b allows a stronger, linear spring force and reduced friction. As before, such lever-type movement of the hook 23 may be facilitated in any known manner without straying from the intended scope of the present invention including the use of pistons, cams, or similar electromechanical mechanisms (not shown). A series of pin-less sockets 20 and associated wafer cones can be held as shown within a flexible conveyor belt 200 to form part of an assembly line system. As shown, this arrangement in accordance with the present invention would require a spring retention mechanism 201 located on the belt 200. However, it should be readily apparent that the spring retention mechanism 201 could be formed integrally with the socket 21 by adding wider flanges on the socket 21. Again, the present invention is advantageous in that the same pin-less socket 20 may form an integral part of many different such assembly line systems.

It should be understood that the size and shape of the one or more teeth in either embodiment mentioned above are optimized to have a positive holding of the wafer with no risk of breaking the associated cone.

FIGS. 3, 4A, 4B, and 5 are simplified schematics of a various manufacturing systems in accordance with the present invention incorporating pin-less sockets of the present invention as shown in FIGS. 1A through 2B. It should be readily understood that either pin-less socket version 10 or 20 may be used within the systems shown in FIGS. 3, 4A, 4B, and 5 and various embodiments of the pin-less sockets 10, 20 may be possible without straying from the intended scope of the present invention. Accordingly, the schematics of FIGS. 3, 4A, 4B, and 5 are simplified for purposes of illustrative clarity and therefore shown without regard to the specific detail of the pin-less socket of the present invention as such details have been discussed above. FIGS. 3, 4A, 4B, and 5 are shown as systems to produce ball-top ice cream cones. The systems illustrated include both simpler ones that translate into less capital cost for a small assembly line with perhaps low volume and more complex ones (e.g., 3 or more conveyors) that translate into a higher capacity line. Any such system may clearly benefit from the incorporation of the inventive pin-less socket.

Figure 3:
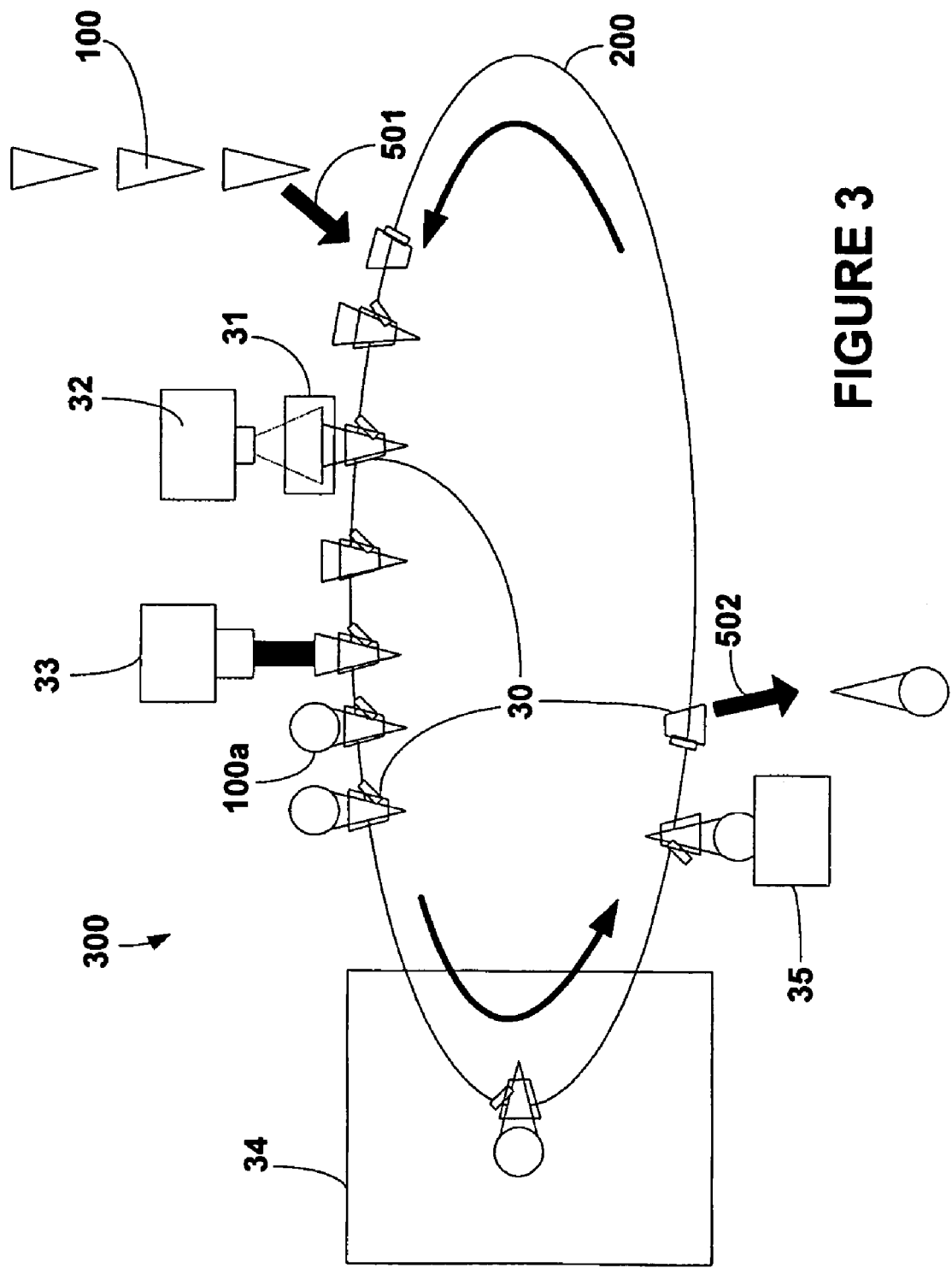
FIG. 3 is a simplified schematic of a single-loop manufacturing system including pin-less sockets of the present invention.

FIG. 3 is a simplified schematic of a single-loop manufacturing system 300 including pin-less sockets 30 of the present invention. FIG. 3 includes a mask device 31 that may be of a heated trough-type that recycles over-spray for coating wafer cones 100 via a sprayer 32 from above. The wafer cones 100 are placed (arrow 501) either manually or via an automated manner such as shown by DE 20209984 using stacked cones into respective pin-less sockets 30 that are situated within a conveyor belt 200 that is shown rotating counter-clockwise. The conveyor belt 200 may be any known carrier mechanism so long as such mechanism is capable of supporting the pin-less sockets 30. The wafer cones 100 are first spray coated from above by the sprayer 32 with a chocolate coating in a manner well known in the art using or via the mask device 31. The coated wafer cone 100 is then moved along the conveyor belt 200 where the wafer cone 100 is filled with a semi-frozen confection (e.g., ice cream) via filler 33 in a manner well known in the art in order to form a ball-top 100a. The filled wafer cone 100 is then moved along the conveyor belt 200 to an area for cooling that includes a hardening tunnel 34. The filled and frozen wafer cone 100 is then moved along the conveyor belt 200 to a dipping area that includes a dipping bin 35. The dipping bin 35 may include more than one coating bin (not shown) that, for example, would add an outer layer of chocolate and subsequently an outer layer of nuts. The finished wafer cone 100 is then released (arrow 502) and packaged (not shown) in a manner well known in the art. It should be understood that a mechanism such as a cam, piston, lever, or similar mechanical device (not shown) is to be used to disengage the wafer cone 100 from engagement within the pin-less socket 30. While only a few pin-less sockets 30 are shown, it should be readily apparent that such sockets are spaced evenly along the entirety of the conveyor belt 200.

Figure 4A:
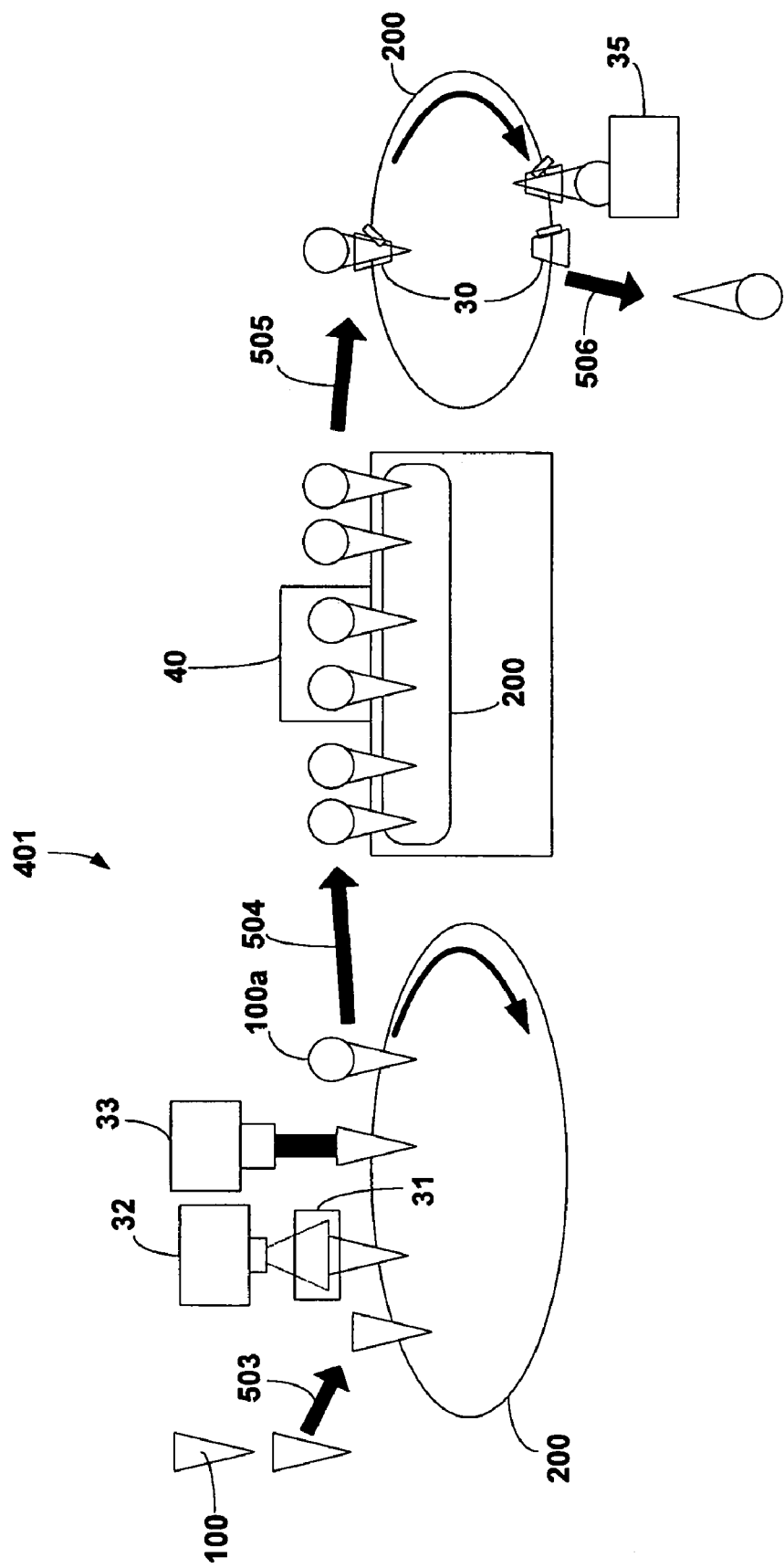
FIGS. 4A and 4B are simplified schematics of two variations of multi-loop manufacturing systems including pin-less sockets of the present invention.
Figure 4B:
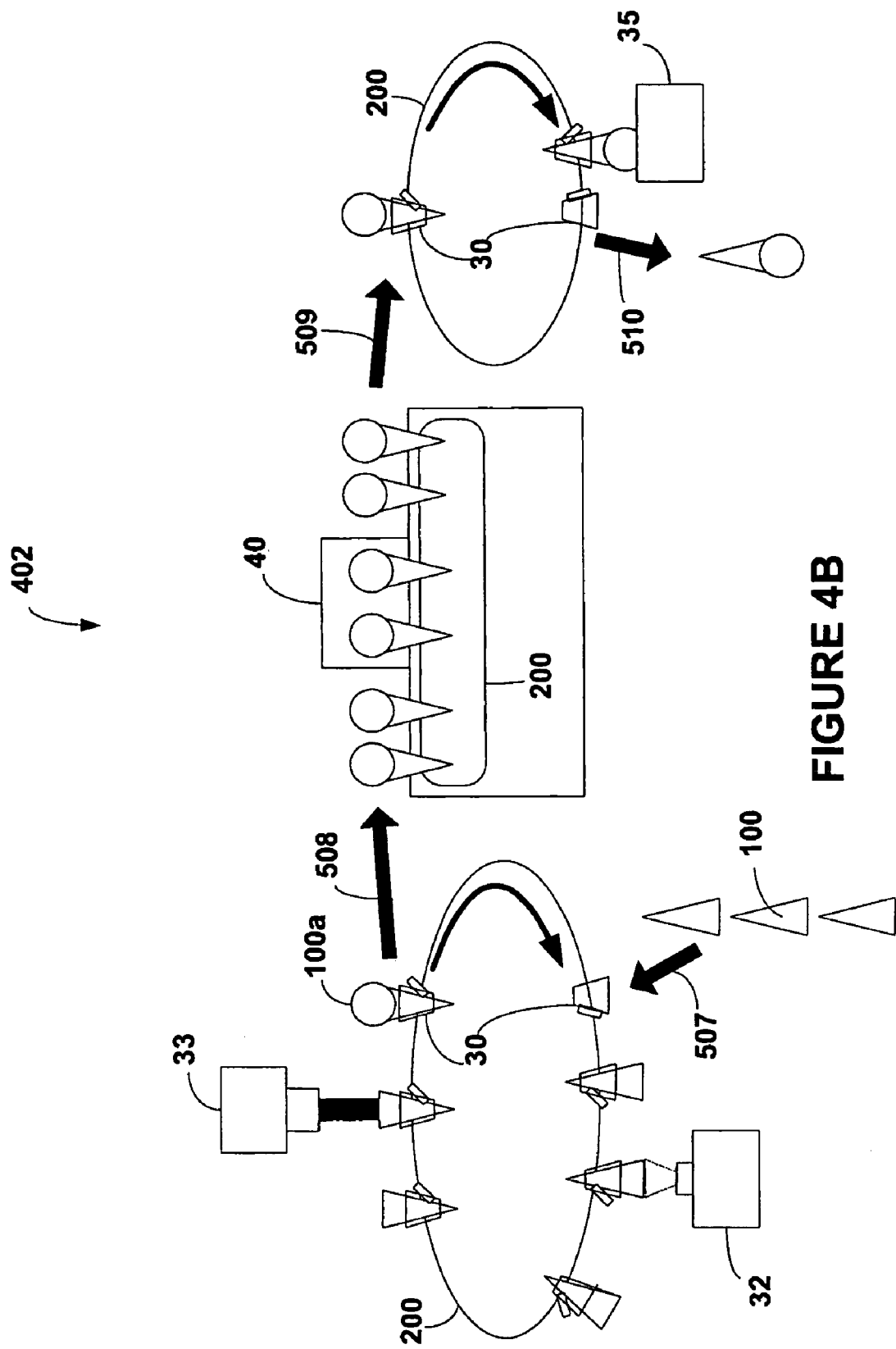

FIGS. 4A and 4B show multi-loop assembly line systems 401, 402 in accordance with the present invention and include hardening tunnels 40 that can be any non-dedicated hardening tool commonly known throughout the art.

FIG. 4A includes three assembly loops. First, wafer cones 100 are placed (arrow 503) either manually or via an automated manner such as shown by DE 20209984 using stacked cones onto a conveyor belt 200. The wafer cones 100 are first spray coated from above by a sprayer 32 with a chocolate coating in a manner well known in the art using or via a mask device 31. Such a mask device 31 may be of a heated trough-type that recycles over spray. The wafer cone 100 is then filled with a semi-frozen confection (e.g., ice cream) via filler 33 in a manner well known in the art in order to form a ball-top 100a. The filled wafer cone 100 is then transferred (arrow 504) via any known manner of automated "pick and place" mechanics to a second assembly loop that includes a hardening tunnel 40. In this embodiment, the hardening tunnel 40 can be any non-dedicated hardening tool commonly known throughout the art. The filled and frozen wafer cone 100 is then transferred (arrow 505) via any known manner of automated "pick and place" mechanics to a third assembly loop that includes a conveyor belt 200 with multiple pin-less sockets 30 and a dipping bin 35. As before, the dipping bin 35 may include more than one coating bin (not shown) that, for example, would add an outer layer of chocolate and subsequently an outer layer of nuts. The finished wafer cone 100 is then released (arrow 506) and packaged (not shown) in a manner well known in the art. As before, it should be understood that a mechanism (not shown) such as a cam, piston, lever, or similar mechanical device is to be used to disengage the wafer cone 100 from engagement within the pin-less socket 30. Each of the three assembly loops are shown as simplified rotating conveyor belts 200. While only a few pin-less sockets 30 are shown, it should be readily apparent that such sockets are spaced evenly along the entirety of the conveyor belt 200 of the third assembly loop.

FIG. 4B is another embodiment of a multi-loop manufacturing system in accordance with the present invention. FIG. 4B differs from FIG. 4A in that coating of the wafer cones 100 occurs from below while the wafer cones 100 are held in place by pin-less sockets 30. The wafer cones 100 are placed (arrow 507) either manually or in an automated manner using stacked cones into respective pin-less sockets 30 that are situated within a conveyor belt 200. The wafer cones 100 are first spray coated from below with a chocolate coating in a manner well known in the art using a sprayer 32. After coating, the wafer cone 100 is then moved along the conveyor belt 200 and filled with a semi-frozen confection (e.g., ice cream) via filler 33 in a manner well known in the art in order to form a ball-top 100a. It should be understood that a mechanism such as a cam, piston, lever, or similar mechanical device would be used to disengage the wafer cone 100 from engagement within the pin-less socket 30. The wafer cone 100 is then transferred (arrow 508) via any known manner of automated "pick and place" mechanics to a cooling area that includes a hardening tunnel 40. Again, the hardening tunnel 40 can be any non-dedicated hardening tool commonly known throughout the art. After hardening, the wafer cone is then transferred (arrow 509) via "pick and place" mechanisms or the like to a dipping area that includes a conveyor belt 200 with multiple pin-less sockets 30 and a dipping bin 35. As before, the dipping bin 35 may include more than one coating bin (not shown) that, for example, would add an outer layer of chocolate and subsequently an outer layer of nuts. The finished wafer cone 100 is then released (arrow 510) and packaged (not shown) in a manner well known in the art in conjunction with a release mechanism (not shown) as mentioned above. Each assembly loop is shown as a simplified rotating conveyor belt 200. While only a few pin-less sockets 30 are shown in each of the first and third loops, it should be readily apparent that such pin-less sockets are spaced evenly along the entirety of the conveyor belts 200.

Figure 5:
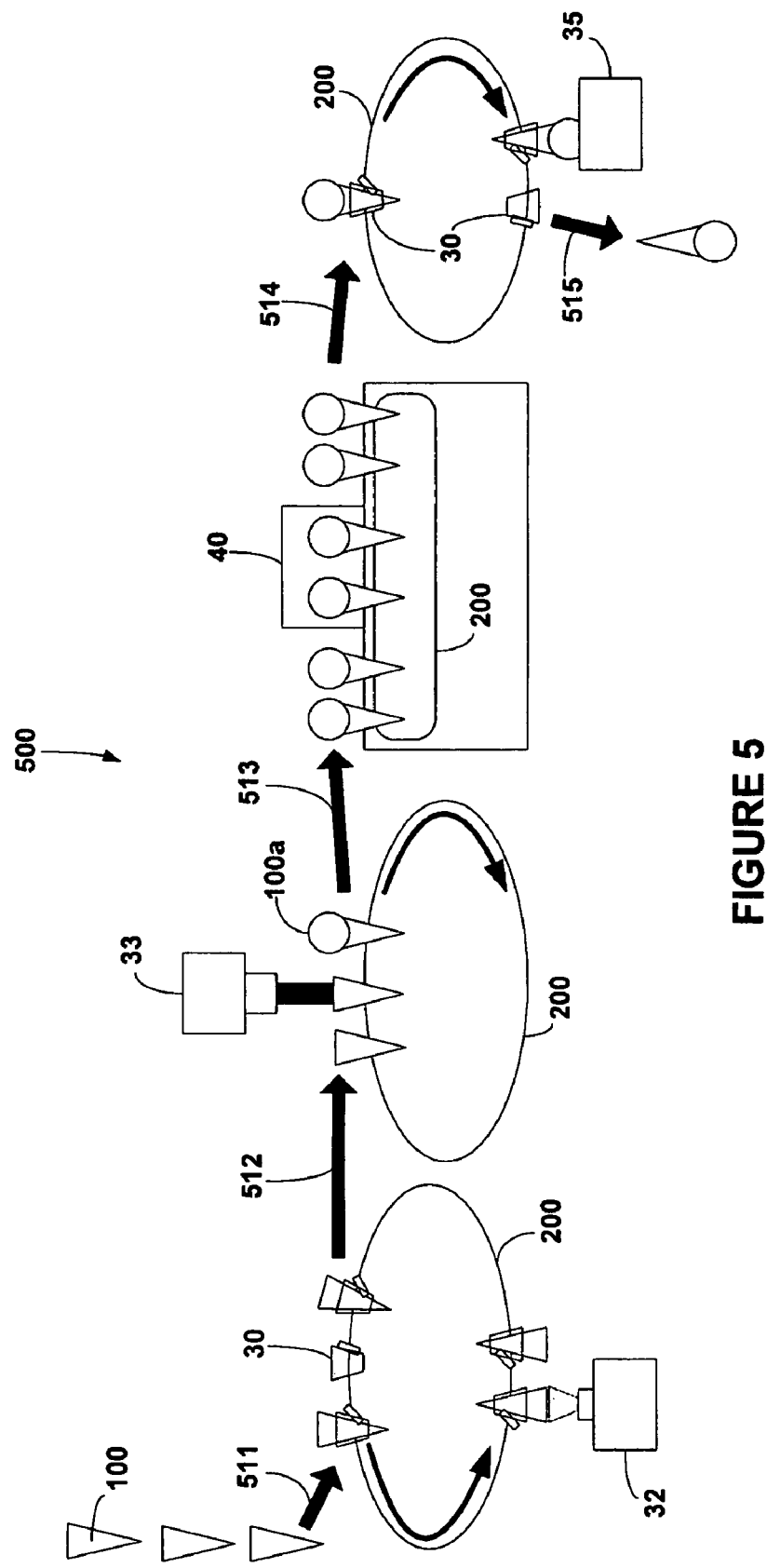
FIG. 5 is another simplified schematic of yet another relatively complex multi-loop manufacturing system including pin-less sockets of the present invention.

FIG. 5 shows yet another embodiment of a multi-loop manufacturing system in accordance with the present invention. Here, four distinct loops are shown that separate the chocolate coating, ice cream filling, hardening, and nut dip stages. From FIG. 5, it is also clear that the assembly loops related to filling and hardening can be made via dedicated filling and hardening mechanisms well known in the art. Separating such stages into distinct loops helps to increase potential manufacturing volume. Specifically, wafer cones 100 are placed (arrow 511) into pin-less sockets 30 either manually or in an automated manner such as shown by DE 20209984 using stacked cones onto a conveyor belt 200 that rotates counter clockwise. The wafer cones 100 then travel along the conveyor belt 200 and are spray coated from below with a chocolate coating in a manner well known in the art using a sprayer 32. After coating, the wafer cone 100 within its respective pin-less socket 30 is moved along the path of the conveyor belt 200 to an area where the wafer cone 100 is then transferred (arrow 512) via any known manner of automated "pick and place" mechanics to a filling second assembly loop that rotates clockwise (i.e., opposite the first loop) and includes a filler 33. It should be understood that a mechanism such as a cam, piston, lever, or similar mechanical device (not shown) is to be used to disengage the wafer cone 100 from engagement within the pin-less socket 30. The filler 33 fills the wafer cone 100 with a semi-frozen confection (e.g., ice cream) in a manner well known in the art in order to form a ball-top 100a. After filling, the wafer cone 100 then transferred (arrow 513) via any known manner of automated "pick and place" mechanics to a cooling area that includes a hardening tunnel 40. Subsequent to hardening, the wafer cone continues via "pick and place" mechanics (arrow 514) to a dipping area that may include more than one coating bin 35 that, for example, would add an outer layer of chocolate and subsequently an outer layer of nuts. The finished wafer cone 100 is then released (arrow 515) and packaged (not shown) in a manner well known in the art. As before, it should be readily apparent that any mechanism such as a cam, piston, lever, or similar mechanical device (not shown) is to be used to disengage the wafer cone 100 from engagement within the pin-less socket 30. Again, it should be understood that while only a few pin-less sockets 30 are shown, such sockets are spaced evenly along the entirety of the conveyor belt 200.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A pin-less socket apparatus, said apparatus comprising:
   a socket for accepting a conical food product therein;
   a hinge located on an outside of said socket;
   a hook having one or more teeth, said hook movably attached to said socket via said hinge; and
   a force means for holding said hook in place within said socket in order to retain said conical food product, said socket including a recess located at an outer periphery thereof and said hook including a notch such that said recess and said notch form an annular groove and said force means is located within said groove.

2. The pin-less socket apparatus as claimed in claim 1 wherein said socket has a truncated cone shape.

3. The pin-less socket apparatus as claimed in claim 2 wherein said force means is an O-ring having elastic properties.

4. The pin-less socket apparatus as claimed in claim 2 wherein said force means is a coil-spring.

5. The pin-less socket apparatus as claimed in claim 2 wherein said recess includes an opening corresponding in shape and size in order to allow movement of said one or more teeth therethrough.

6. The pin-less socket apparatus as claimed in claim 1 wherein
   said socket includes a recess located at an outer periphery thereof and said hook includes a notch such that said force means is connectable to said notch in a manner so as to provide lever-type movement of said hook relative to said hinge.

7. The pin-less socket apparatus as claimed in claim 6 wherein said force means is a linear spring connected at one end to said hook at said notch and at another end to a fixed point.

8. The pin-less socket apparatus as claimed in claim 7 wherein said recess includes an opening corresponding in shape and size in order to allow movement of said one or more teeth therethrough.

* * * * *